Patented Apr. 16, 1940

2,197,049

UNITED STATES PATENT OFFICE 2,197,049

REACTION PRODUCT OF MALEIC ANHYDRIDE WITH A FURFURYL ESTER OF A HYDROGENATED ROSIN ACID, AND METHOD OF PRODUCING

Irvin W. Humphrey and Joseph N. Borglin, Wilmington, Del., assignors to Hercules Powder Company, Wilmington, Del., a corporation of Delaware No Drawing. Application March 21, 1939,
Serial No. 263,270

14 Claims. (Cl. 260—101)

This invention relates to a new composition of matter and method for its production, more particularly, the composition in accordance with this invention involves the esterification of a furfuryl alcohol with a hydrogenated rosin acid and reaction of the resulting ester with maleic anhydride.

In preparing the composition by the method in accordance with this invention, a hydrogenated rosin acid such as hydrogenated abietic acid, hydrogenated pimaric acid, etc., is reacted with a furfuryl alcohol to form an ester, and the ester then reacted with maleic anhydride to form an acidic condensation product. The acidic condensation product resulting from the above process may then be esterified with an alcohol.

The furfuryl alcohol for use in preparing the composition in accordance with this invention may be furfuryl alcohol itself or a substituted furfuryl alcohol in which the unsaturated linkages present in furfuryl alcohol have not been altered, such as, for example, methyl furfuryl alcohol, ethyl furfuryl alcohol, methoxy furfuryl alcohol, ethoxy furfuryl alcohol, etc. The hydrogenated rosin acid may be the product of hydrogenation of the rosin acid itself or of a rosin containing a rosin acid, as, for example, commercial abietic acid, wood or gum rosin, etc. As equivalents for the alcohols indicated, an inorganic ester of the alcohols, as, for example, furfuryl chloride, may be used and equivalently where an inorganic ester is used in place of the alcohol, salts of the hydrogenated rosin acid as, for example, the sodium or potassium salts, etc., may be used, preferably in alcoholic solution, in place of the hydrogenated rosin acid or rosin.

The hydrogenated rosin acid or rosin for use in this invention may be the product of hydrogenation of a rosin acid or rosin by any of the well-known methods involving use of hydrogenation catalysts. The hydrogenated rosin acid or rosin will preferably be saturated to the extent of at least 50 per cent of the theoretical saturation of the double bonds in the original rosin acid or rosin.

In carrying out the method in accordance with this invention, the hydrogenated rosin acid will, as has been indicated, be reacted with the furfuryl alcohol in the presence of heat, and, if desired, also in the presence of an acid catalyst, as, for example, p-toluene sulfonic acid, hydrogen chloride, boric acid, etc. Where an acid catalyst is used, however, such will be used in small quantity, say in amount of about 0.01% to about 5.0% in order to avoid excessive polymerization of the furfuryl alcohol. Further, if desired, a hydrocarbon as, for example, toluene, xylene, mineral spirits, or the like, may be used to assist in removing water of reaction.

In carrying out the method in accordance with this invention the furfuryl alcohol and hydrogenated rosin acid may be treated in any desired quantities, preferably with the alcohol in excess of that required for combination with the hydrogenated rosin acid. The reaction may be carried out at any suitable temperature, say for example, within about the range of 100–300° C., with or without super-atmospheric pressure depending upon the temperature. The time required will be dependent substantially upon the temperature and whether or not a catalyst is used. As has been indicated, an inorganic ester of the furfuryl alcohol and a salt of the hydrogenated rosin acid may be used equivalently for the furfuryl alcohol and the hydrogenated rosin acid, and when such are used they will be desirably used in alcoholic solution, as in solutions of ethyl, butyl, methyl, etc., alcohol, and the reaction will be carried out under pressure, depending upon the temperature used, in order to avoid loss of the alcohol.

The ester of the furfuryl alcohol and the hydrogenated rosin acid will then, as has been indicated, be reacted with maleic anhydride, or equivalently, maleic acid, to produce the acidic condensation product. Thus, by heating one mole of the ester of the furfuryl alcohol with one mole of maleic anhydride at about 125–200° C., a combination occurs between the said ester and the maleic anhydride to form a resinous, acidic condensation product. This resinous, acidic condensation product may then, if desired, be esterified with an alcohol, e. g., a monohydric alcohol such as methyl, ethyl, propyl, butyl, bornyl, tetrahydrofurfuryl, benzyl, abietyl, hydroabietyl, stearyl, oleyl, naphthenyl, pimaryl, hydropimaryl, etc., alcohols, cyclohexanol, ethylene glycol monoethyl ether, etc., or either partially or completely esterified with a polyhydric alcohol, such as ethylene glycol, diethylene glycol, triethylene glycol, glycerol, pentaerythrite, etc., or mixtures of the foregoing alcohols. The esterified, or partially esterified acidic condensation product may be modified by the addition of rosin, hydrogenated rosin, linseed oil or China-wood oil, the free acids of these oils, acids such as stearic, oleic, palmitic, abietic, hydroabietic, pimaric, hydropimaric, furoic, succinic, adipic, maleic acid or anhydride, phthalic acid or anhydride, etc., or mixtures thereof.

As illustrative of procedure in accordance with the method of this invention, for the production of an acidic condensation product by reaction of maleic anhydride with the ester formed from furfuryl alcohol and hydrogenated rosin, for example, 500 parts by weight of hydrogenated rosin prepared by saturating N-wood rosin to about 65 per cent of both double bonds of the abietic acid contained in the rosin in any well-known manner, are heated with 200 parts by weight of furfuryl alcohol at a temperature of 200° C. for sixteen hours in a carbon dioxide atmosphere. The unreacted alcohol is then removed by distillation under reduced pressure. About 544 parts by weight of the viscous furfuryl ester of hydrogenated rosin results, having a refractive index of 1.5198 at 20° C.

The reaction may be speeded up by autoclaving at say about 200–250° C., or by proceeding continuously as by passing the reagents through a reaction chamber at a relatively high temperature.

The crude product, the furfuryl ester of hydrogenated rosin, may be purified by washing with an alkaline solution, if necessary, for example, a sodium carbonate solution, to remove excess abietic acid if present; distilling to remove volatiles, and fractionation in vacuo to remove any polymerized ester if desired, though it will be understood that the polymerized ester will be as advantageous and equivalent to the unpolymerized ester. The ester may be refined by dissolving in a suitable solvent such as gasoline, mineral spirits, etc., and agitating with a substantially immiscible color body solvent, as phenol, resorcinol, aniline, furfural, etc.

The reaction of maleic anhydride with the furfyl ester of hydrogenated rosin is carried out, for example, by heating 350 parts by weight of the furfuryl ester of hydrogenated rosin, with 84 parts by weight of maleic anhydride at a temperature of about 180–200° C. for four hours in a carbon dioxide atmosphere. Reduced pressure is then applied to remove any unreacted maleic anhydride, but practically none will be present. An acidic condensation product amounting to about 432 parts by weight will result, having an acid number of about 199 and a refractive index of 1.5175 at 20° C. It is a soft, pale yellow resin.

As illustrative of procedure for the esterification of the acidic condensation product produced as above, 193 parts by weight of the acidic condensation product and 200 parts by weight of butyl alcohol are heated together under reflux at a temperature of about 150° C. for eight hours, and the unreacted butyl alcohol then removed under reduced pressure. About 244 parts by weight of the liquid butyl ester are obtained. As further illustrative of the esterification, 193 parts by weight of the acidic condensation product of maleic anhydride with the furfuryl ester of hydrogenated rosin are heated with 150 parts by weight of ethylene glycol under reflux at a temperature of about 200° C. for eight hours. The excess glycol is then removed under reduced pressure. About 219 parts by weight of the glycol ester are recovered as a soft resin.

As will now be apparent, the product in accordance with this invention will be a reaction product formed by esterifying a hydrogenated rosin acid with a furfuryl alcohol and further reacting this product with maleic anhydride to form a resinous acidic reaction product. The latter product may, if desired, be esterified with an alcohol. Further, as will now be apparent, the method in accordance with this invention will involve esterification of a hydrogenated rosin acid, as hydrogenated abietic acid or hydrogenated rosin, with a furfuryl alcohol, reaction of the ester so formed with maleic anhydride to form a resinous acidic condensation product, and esterification of the latter, if desired, with an alcohol.

The product in accordance with this invention, either the acidic condensation product or an ester thereof, will be found advantageous for use in the commercial arts and more especially as an ingredient in coating compositions as, for example, lacquers, varnishes, films, various plastic compositions. Thus, the reaction product of maleic anhydride with a furfuryl ester of a hydrogenated rosin, or an ester of such reaction product, may be employed in lacquer compositions, for example, and by using 8 parts of the acidic condensation product or ester thereof, 4 parts of dammar, 10 parts of nitrocellulose and 78 parts of solvents and diluents.

It will be understood that the details and examples hereinbefore set forth are illustrative only, and that the invention as broadly described and claimed is in no way limited thereby.

This application forms a continuation-in-part of our application Serial No. 152,666, filed July 8, 1937, which is in turn a continuation-in-part of our application, Serial No. 619,121 filed by Humphrey and Borglin, June 24, 1932, for Resin acid ester and method of producing the same, now United States Patent No. 2,089,375.

What we claim and desire to protect by Letters Patent is:

1. The reaction product of an ester of an unsaturated furfuryl alcohol and a hydrogenated rosin acid with maleic anhydride.
2. The reaction product of an ester of an unsaturated furfuryl alcohol and hydrogenated abietic acid with maleic anhydride.
3. The reaction product of an ester of an unsaturated furfuryl alcohol and hydrogenated wood rosin with maleic anhydride.
4. The reaction product of an ester of an unsaturated furfuryl alcohol and hydrogenated gum rosin with maleic anhydride.
5. The reaction product of an ester of furfuryl alcohol and hydrogenated abietic acid with maleic anhydride.
6. The reaction product of an ester of furfuryl alcohol and hydrogenated wood rosin with maleic anhydride.
7. The reaction product of an ester of furfuryl alcohol and hydrogenated gum rosin with maleic anhydride.
8. The reaction product of an alcohol with the reaction product of an ester of an unsaturated furfuryl alcohol and a hydrogenated rosin acid with maleic anhydride.
9. The method which includes reacting an unsaturated furfuryl alcohol with a hydrogenated rosin acid, and reacting the resulting ester with maleic anhydride.
10. The method which includes reacting furfuryl alcohol with a hydrogenated rosin acid and reacting the resulting ester with maleic anhydride.
11. The method which includes reacting furfuryl alcohol with hydrogenated abietic acid, and reacting the resulting ester with maleic anhydride.

12. The method which includes reacting furfuryl alcohol with hydrogenated wood rosin, and reacting the resulting ester with maleic anhydride.

13. The method which includes reacting furfuryl alcohol with hydrogenated gum rosin, and reacting the resulting ester with maleic anhydride.

14. The method which includes reacting an unsaturated furfuryl alcohol with a hydrogenated rosin acid, reacting the ester formed with maleic anhydride, and esterifying the resulting product with an alcohol.

IRVIN W. HUMPHREY.
JOSEPH N. BORGLIN.